United States Patent
Ko

(10) Patent No.: US 7,831,598 B2
(45) Date of Patent: Nov. 9, 2010

(54) DATA RECORDING AND REPRODUCING APPARATUS AND METHOD OF GENERATING METADATA

(75) Inventor: Chang-seog Ko, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 11/650,539

(22) Filed: Jan. 8, 2007

(65) Prior Publication Data

US 2008/0033983 A1 Feb. 7, 2008

(30) Foreign Application Priority Data

Jul. 6, 2006 (KR) .................... 10-2006-0063487

(51) Int. Cl.
*G06F 7/00* (2006.01)
*G06F 17/00* (2006.01)

(52) U.S. Cl. ...................... 707/736; 707/791
(58) Field of Classification Search ............... None
See application file for complete search history.

(56) References Cited

U.S. PATENT DOCUMENTS

| | | | | |
|---|---|---|---|---|
| 6,031,526 | A * | 2/2000 | Shipp ................... 715/201 |
| 6,499,016 | B1 * | 12/2002 | Anderson ................ 704/275 |
| 6,907,397 | B2 * | 6/2005 | Kryze et al. ............ 704/251 |
| 7,053,938 | B1 * | 5/2006 | Sherry ................. 348/231.4 |
| 7,324,943 | B2 * | 1/2008 | Rigazio et al. ......... 704/270 |
| 7,634,407 | B2 * | 12/2009 | Chelba et al. ........... 704/251 |
| 2003/0204399 | A1 * | 10/2003 | Wolf et al. ............. 704/251 |
| 2004/0119837 | A1 | 6/2004 | Inoue |
| 2005/0228665 | A1 | 10/2005 | Kobayashi et al. |
| 2006/0264209 | A1 * | 11/2006 | Atkinson et al. ........ 455/422.1 |
| 2007/0088555 | A1 * | 4/2007 | Layher .................. 704/270 |
| 2007/0174326 | A1 * | 7/2007 | Schwartz et al. .......... 707/102 |
| 2007/0198511 | A1 * | 8/2007 | Kim et al. .................. 707/6 |
| 2007/0236583 | A1 * | 10/2007 | Vuong et al. ........... 348/231.99 |

FOREIGN PATENT DOCUMENTS

| | | |
|---|---|---|
| CN | 1506741 A | 6/2004 |
| CN | 1663249 A | 8/2005 |
| CN | 1790535 A | 6/2006 |
| JP | 2003-111009 A | 4/2003 |
| JP | 2005-346259 A | 12/2005 |
| KR | 10-1999-0054504 A | 7/1999 |
| KR | 1020030040036 A | 5/2003 |
| KR | 1020030097669 A | 12/2003 |
| KR | 10-2005-0014918 A | 2/2005 |
| KR | 1020050083715 A | 8/2005 |
| KR | 1020060096026 A | 9/2006 |
| KR | 1020060109331 A | 10/2006 |

* cited by examiner

*Primary Examiner*—John R. Cottingham
*Assistant Examiner*—Michael Pham
(74) *Attorney, Agent, or Firm*—Sughrue Mion, PLLC

(57) ABSTRACT

A data recording and reproducing apparatus and a method of generating metadata are provided. The data recording and reproducing apparatus includes: a signal processor capturing images, processing the captured images to generate image data, and generating an image file that includes the image data; a speech recognition unit recognizing speech and converting the speech into text data; and a controller using the text data to generate metadata and adding the metadata to the image file. Accordingly, at a time when images are recorded, metadata is generated as management information corresponding to image contents by using an image contents recording apparatus. Therefore, reliable metadata corresponding to the image contents can be generated.

12 Claims, 4 Drawing Sheets

FOLDER NAME: 20060312_GILDONG'S BIRTHDAY PARTY
FILE NAME : DSC0001.jpg
PICTURE FILE "DESCRIPTION" TAG: GILDONG'S BIRTHDAY PARTY/
                                GILDONG HAVING HIS BIRTHDAY PARTY
PICTURE FILE "KEYWORD" TAG: GILDONG/BIRTHDAY PARTY

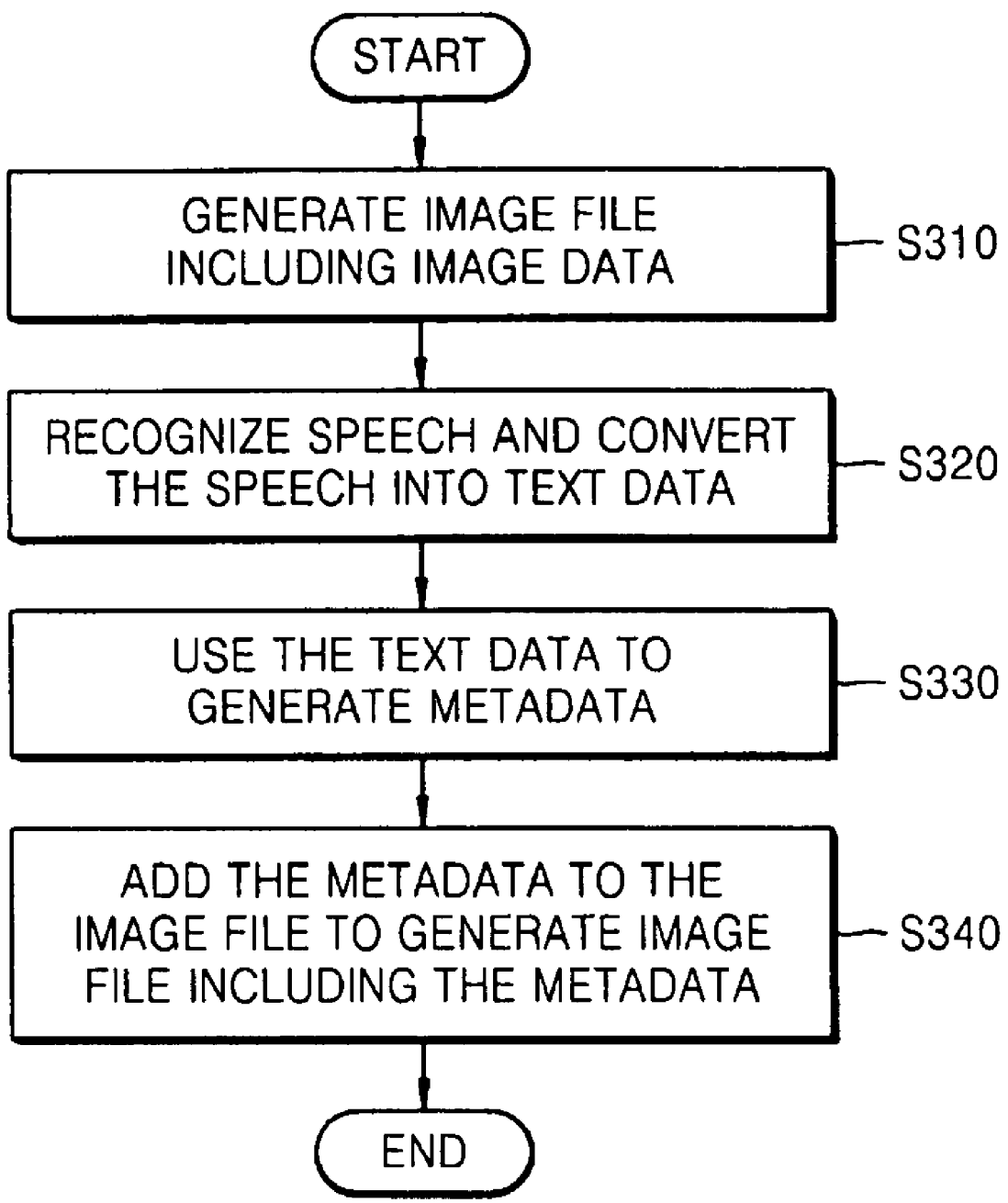

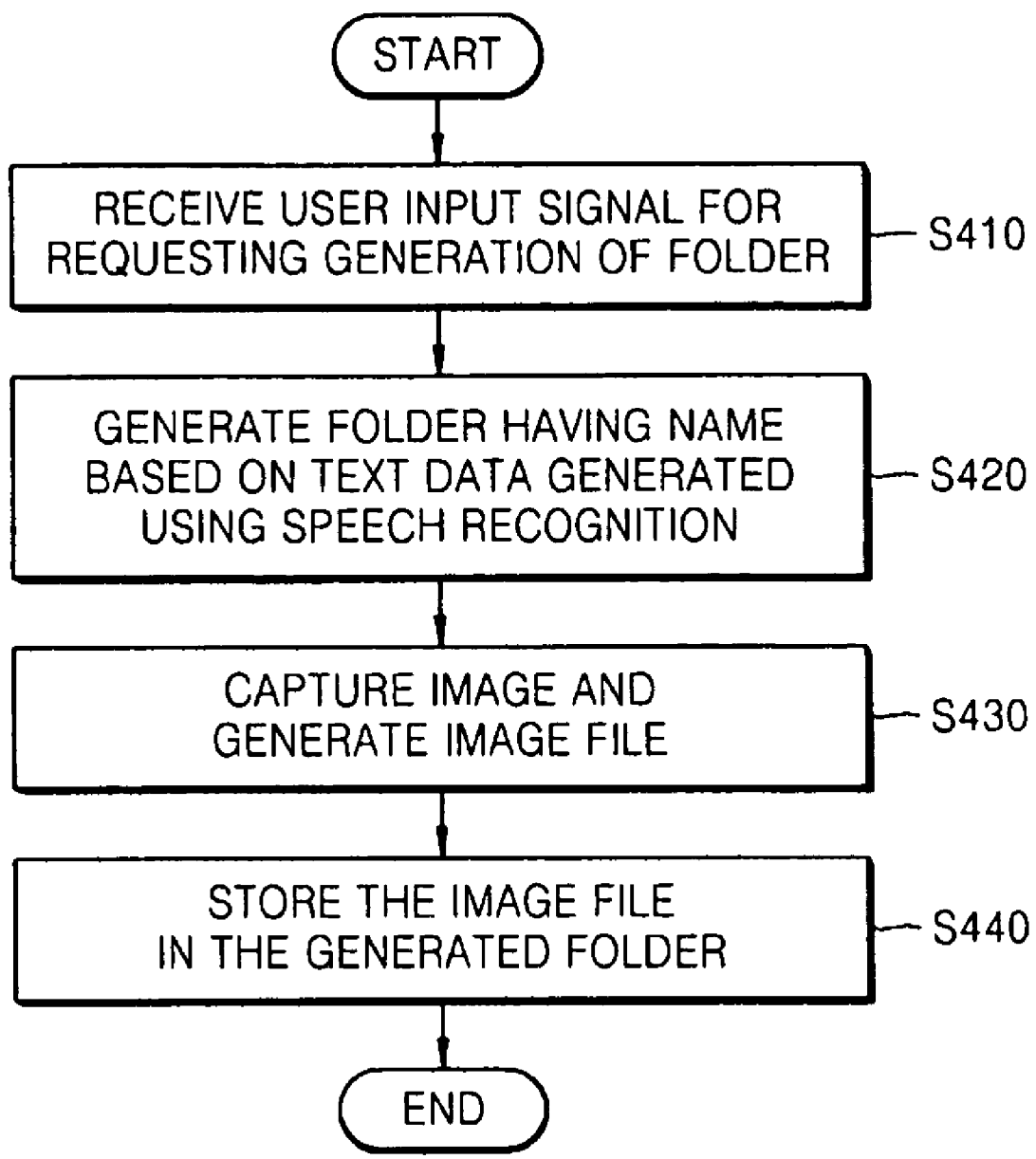

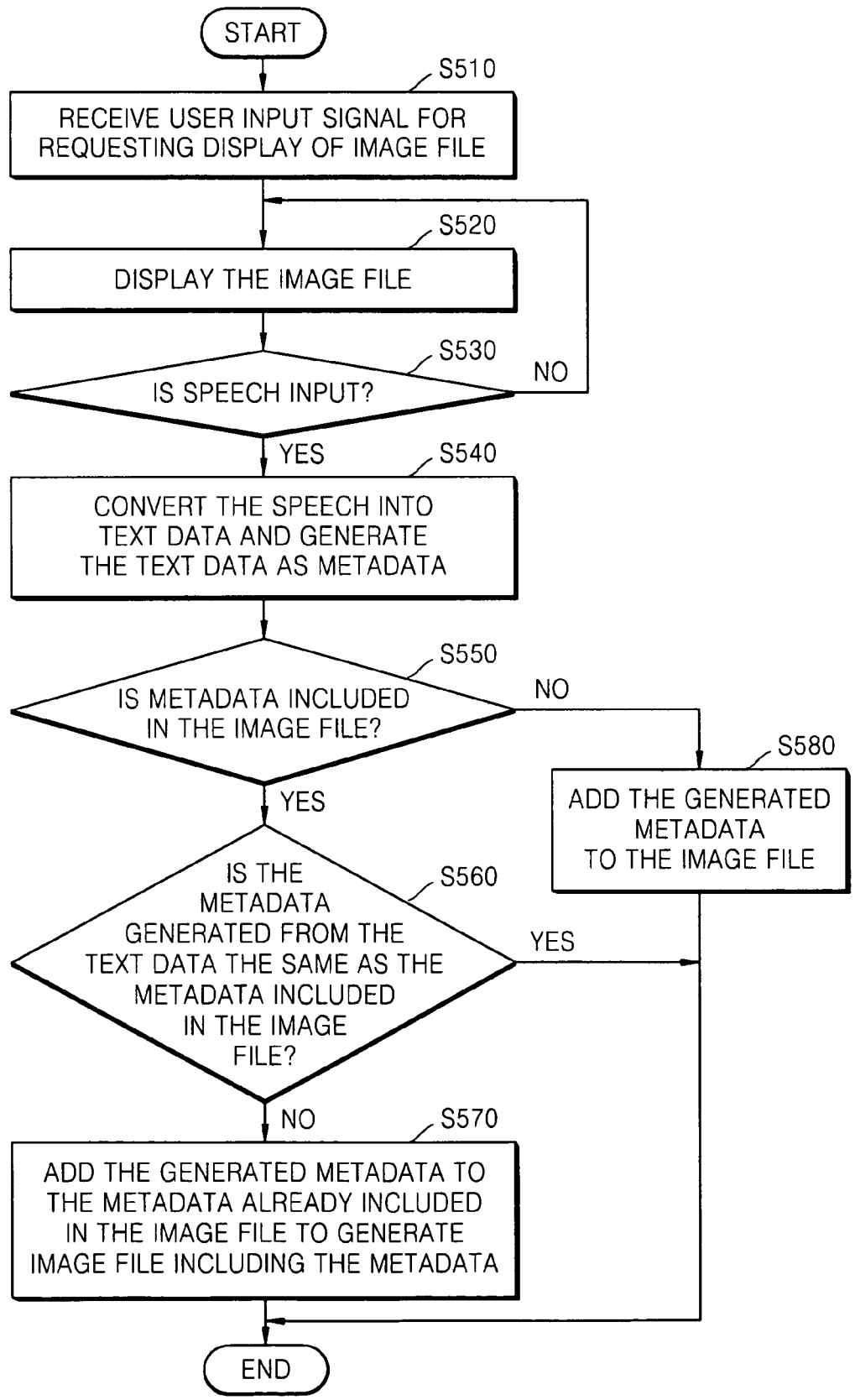

DATA RECORDING AND REPRODUCING APPARATUS AND METHOD OF GENERATING METADATA

CROSS-REFERENCE TO RELATED PATENT APPLICATION

This application claims the benefit of Korean Patent Application No. 10-2006-0063487, filed on Jul. 6, 2006, in the Korean Intellectual Property Office, the entire disclosure of which is incorporated herein by reference.

BACKGROUND OF THE INVENTION

1. Field of the Invention

Apparatuses and methods consistent with the present invention relate to a recording and reproducing data, and more particularly, to a data recording and reproducing apparatus and a method of generating metadata as management information for managing and retrieving image contents using the data recording and reproducing apparatus.

2. Description of the Related Art

As digital cameras have become more and more widespread, opportunities for a user to retrieve and manage digital images have increased. To retrieve and manage digital images, the user transfers image files stored in a camera to a computer, and the user further records additional information on pictures or moving images by using an image management and editing program on the computer. In addition, the user may classify the pictures or moving images according to category such as a shooting location or a shooting time by using the image management and editing program on the computer.

However, when the user manages the images by using the image management and editing program, the user may record additional notes in the image contents. In this case, the user sometimes cannot remember precisely who are the persons depicted in the images or the shooting locations where the images are taken. In addition, in order to manage the image files, the images stored in the camera first need to be downloaded to the computer. Moreover, the additional information such as the notes about the images recorded by using the image management and editing program may not be read by another image management and editing programs.

SUMMARY OF THE INVENTION

The present invention provides a data recording and reproducing apparatus and a method capable of easily managing image files by generating metadata as management information with respect to the image files in an image recording apparatus.

The present invention also provides a data recording and reproducing apparatus and a method capable of generating metadata with respect to image contents by using speech recognition.

According to an aspect of the present invention, there is provided a data recording and reproducing apparatus including: a signal processor capturing images, processing the captured images to generate image data, and generating an image file comprising the image data; a speech recognition unit recognizing speech and converting the speech into text data; and a controller, which generates metadata using the text data and adds the metadata to the image file.

In the above aspect, the controller may use the text data to generate a description tag, and may extract keywords from the text data to generate a keyword tag, thereby generating the metadata.

In addition, the data recording and reproducing apparatus may further include a storage unit storing the generated image file.

In addition, the controller may generate a folder and a name for the folder based on the text data.

In addition, the controller may store the image file in the named folder based on the text data.

In addition, the data recording and reproducing apparatus may further include a display unit displaying the image represented by the image data in the image file or displaying the metadata along with the image.

In addition, if newly input speech is converted into text data by the speech recognition unit while the image represented by the image data in the image file is displayed on the display unit, the controller may generate metadata from the converted text data and compare the generated metadata with the metadata already included in the image file, and when the generated metadata is different from the metadata in the image file, the controller may add the generated metadata to the metadata in the image file.

In addition, if speech is input to the speech recognition unit to be converted into text data when no image data is displayed on the display unit, the controller may generate a folder and a name for the folder based on the text data.

In addition, the data recording and reproducing apparatus may further include an audio output unit outputting an audio signal, and the controller may convert the metadata included in the image file which is currently displayed into an audio signal to output the audio signal to the audio output unit while the image file is displayed on the display unit.

According to another aspect of the present invention, there is provided a data recording and reproducing method including: capturing images, generate image data based on the captured images, and generating an image file including the image data; recognizing speech and converting the speech into text data; generate metadata using the text data; and adding the metadata to the image file.

BRIEF DESCRIPTION OF THE DRAWINGS

The above and other aspects of the present invention will become more apparent by describing in detail exemplary embodiments thereof with reference to the attached drawings in which:

FIG. 3 is a flowchart illustrating a data recording method of generating metadata according to an exemplary embodiment of the present invention;

FIG. 4 is a flowchart illustrating a data recording method of generating metadata according to another exemplary embodiment of the present invention; and FIG. 5 is a flowchart illustrating a method of recording and reproducing an image file that includes metadata according to an exemplary embodiment of the present invention.

DETAILED DESCRIPTION OF EXEMPLARY EMBODIMENTS OF THE INVENTION

Figures 1, 2:
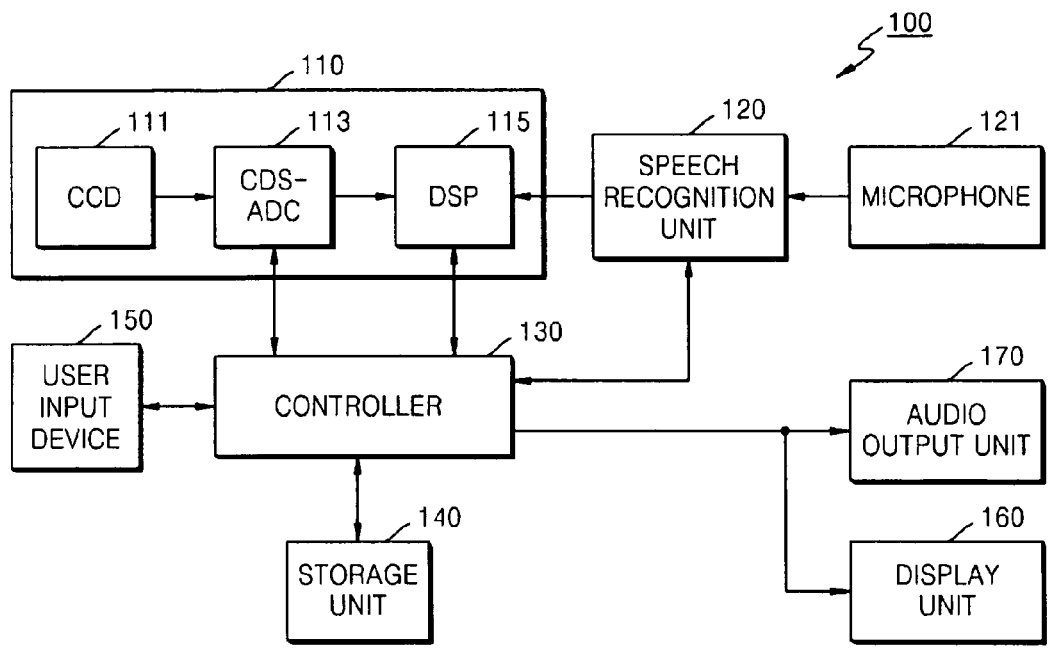
FIG. 1 is a block diagram showing a structure of a data recording and reproducing apparatus for generating metadata according to an exemplary embodiment of the present invention.
FIG. 2 is an illustration showing metadata included in an image file and a folder name generated based on text data converted by using speech recognition according to an exemplary embodiment of the present invention.

Hereinafter, the exemplary embodiments of the present invention will be described more fully with reference to the accompanying drawings.

FIG. 1 is a block diagram showing a structure of a data recording and reproducing apparatus for generating metadata according to an exemplary embodiment of the present invention.

The data recording and reproducing apparatus 100 according to an exemplary embodiment of the present invention includes a signal processor 110, a speech recognition unit 120, a controller 130, a storage unit 140, a user input device 150, a display unit 160, and an audio output unit 170. The data recording and reproducing apparatus 100 according to the exemplary embodiment of the present invention may be a digital camera or a camcorder capable of recording and reproducing still images and moving images.

The signal processor 110 captures an image or images and processes the captured image to generate image data. The signal processor 110 includes a charged coupled device (CCD) 111, a correlation double sampler-analog to digital converter (CDS-ADC) 113, and a digital signal processor (DSP) 115. The CCD 111 optically receives an image focused by a lens (not shown) and converts the image into electrical analog signals to provide the electrical analog signals to the CDS-ADC 113. The CDS-ADC 113 processes and converts the analog signals into digital signals. The DSP 115 processes the digital signals according to a predetermined resolution to generate a digital image file. In addition, the DSP 115 compresses the digital image file according to a selected compression ratio to generate a compressed digital image file.

The speech recognition unit 120 recognizes speech input into a microphone 121 and converts the speech into text data.

The controller 130 controls data transmission and reception between the individual devices/units in the data recording and reproducing apparatus 100 shown in FIG. 1. In addition, the controller 130 uses the text data to generate metadata, and adds the metadata to the image file generated by the signal processor 110. The controller 130 may use the text data to generate a description tag and extract keywords from the text data to assign the extracted keywords as a keyword tag, thereby generating the metadata. The above-provided method of generating and including the metadata by the controller 130 is provided by way of an example only. The generation of the metadata and including the metadata into the image file may be performed in a number of ways that are within the scope of the invention. In addition, the controller 130 may provide a display unit 160 with a user interface menus e.g., menus for receiving a user input signal. The display unit 160, such a computer display, will display the provided user interface to the user.

When the digital image file generated by the DSP 115 includes still image data, the digital image file may be in Joint Photographic Experts Group (JPEG) or Tag Image File Format (TIFF) format. When the digital image file includes moving image data, the digital image file may be in Moving Picture Experts Group (MPEG) format. Each of the image files includes an area for storing the image data and an area for storing information regarding the image. The area for storing the information regarding the image is called a header area. For example, a JPEG image file includes Exchangeable Image Format (EXIF) data in the header area. The EXIF data includes information regarding the image such as camera manufacturing company, camera model, exposure time, aperture number, shutter speed, lens aperture, flash use, focal length, or the like.

According to the exemplary embodiment of the present invention, the controller 130 may generate an image file including metadata by adding the description tag and the keyword tag, generated by using the speech recognition unit 120 and the controller 130 to the EXIF data as the metadata. The image file generated as described above is stored in the storage unit 140.

When the controller 130 adds the description tag and the keyword tag to the image file, identifiers of the description tag and the keyword tag may also be added thereto. Therefore, the description tag and the keyword tag can be easily identified and interpreted in the image file. In addition, the controller 130 may arrange the description tag and the keyword tag in a specific position in the header area. Therefore, when the image file generated according to the exemplary embodiment of the present invention is reproduced, the metadata may be read by reading the description tag and the keyword tag which are in the specific position. Accordingly, the apparatus for reading and reproducing the image file generated according to the exemplary embodiment of the present invention can retrieve or classify the image file by using the description tag or the keyword tag as retrieving keywords. In addition, when the image file is uploaded to a network such as the Internet, a number of people can retrieve image files having common metadata by using the metadata included in the image file.

The user input device 150 may be a keypad having key buttons, a selection lever for selecting a menu displayed on the display unit 160, or a touch screen. The user input device 150 receives the user input signal and transmits the user input signal to the controller 130. The controller 130 performs operations required by the user input signal. For example, on the basis of a user input signal for requesting image capture, the controller 130 may control the signal processor 110 to capture the image and generate the image file. In addition, the controller 130 may generate the metadata, in order to generate an image file including the metadata according to the exemplary embodiment of the present invention, only when a user input signal for requesting generation of the metadata is received from the user input device 150.

The controller 130 may generate a folder and a name for this folder based on text data converted by the speech recognition unit 120. The controller 130 may generate the folder and the name for this folder based on the text data only when a user input signal for requesting generation of the named folder based on the text data is received from the user input device 150. Next, the controller 130 may store the image file generated after receiving the user input signal in the named folder based on the text data.

The display unit 160 may display only the image data in the image file or may display the metadata along with the image data, as controlled by the controller 130. For example, when a user input signal for requesting a display of the image file stored in the storage unit 140, is received from the user input device 150, the controller 130 may control the display unit 160 to display the image data with or without the metadata included in the image file. Accordingly, the image data with or without the metadata will be displayed on the display unit 160.

When speech is newly input to the speech recognition unit 120 and converted into text data while a user reviews the captured image data by using the display unit 160, in other words, while the image data stored in the image file is displayed on the display unit 160, the controller 130 uses the text data to generate metadata and compares the generated metadata with the metadata already included or stored in the image file. In this case, when the generated metadata is different from the metadata in the image file, the controller 130 adds the generated metadata to the metadata already included or stored in the image file. In the same manner, although metadata is already stored in the image file, the metadata may be modified by adding other metadata. In addition, the metadata may be modified according to a user input signal from the user input device 150.

The audio output unit 170 outputs an audio signal. While the image file is displayed on the display unit 160, the controller 130 converts the metadata included in the image file into an audio signal to output the audio signal to the audio output unit 170. As described above, the controller 130 performs text to speech operation, so that the user can audibly listen to the metadata while reviewing the image file.

FIG. 2 is an illustration showing metadata included in an image file and a folder name generated based on text data converted by using speech recognition according to an exemplary embodiment of the present invention.

As shown in FIG. 2, it is assumed that a user input signal for requesting generation of a name of a folder in which the image file is to be stored using the text data generated by using the speech recognition, is received from the user input device 150, and a speech of "Gildong's birthday party" is input through the microphone 121. Next, the speech of "Gildong's birthday party" is converted into text data by the speech recognition unit 120, and a folder having the name of "Gildong's birthday party" is generated in the storage unit 140 by the controller 130. In addition, the name of the folder may include a folder generation date as shown in FIG. 2, so that the name of the folder may be generated to be "20060312_Gildong's birthday party".

It is assumed that, while the user reviews an image file, that is, a scene of Gildong's birthday party, the phrase "Gildong having his birthday party" is spoken into the microphone 121. In this case, the phrase of "Gildong having his birthday party" is converted into text data by the speech recognition unit 120, and the controller 130 uses the text data of "Gildong having his birthday party" to generate a description tag and adds the description tag as metadata to the image file. When the description tag is generated by using the text data, the text data may be modified to be "Gildong's birthday party". In addition, the controller 130 may extract nouns as keywords from the text data of "Gildong having his birthday party", so that a keyword tag of "Gildong, birthday party" may be added to the image file as metadata. A file name may be generated as DSC0001.jpg as shown in FIG. 2 according to a predetermined method.

As described above, the metadata to be included in the image file is generated by using the text data converted by using speech recognition, so that it is possible to add reliable metadata such as shooting locations or persons being displayed in the image to the image file while reviewing the image right after the capture of the image. In addition, the name of the folder in which the image file is to be stored is generated based on the text data that is converted by using speech recognition, so that it is possible to classify the image files at a time when the image is captured.

FIG. 3 is a flowchart illustrating a data recording method of generating metadata according to an exemplary embodiment of the present invention.

In operation S310, a signal processor 110 captures an image, processes the captured image to generate image data, and generates an image file including the image data. In operation S320, a speech recognition unit 120 recognizes speech input thereto and converts the speech into text data.

In operation S330, the controller 130 uses the text data to generate metadata. In this case, the text data is used to generate a description tag. In addition, keywords may be extracted from the text data, and the extracted keywords may be used to generate a keyword tag.

In operation S340, the controller 130 adds the metadata to the image file to generate an image file including the metadata. For example, the description tag and/or the keyword tag generated in operation S330 are identified by identifiers to be added to the image file as the metadata, so that the image file including the metadata can be generated. The generated image file is stored in the storage unit 140.

FIG. 4 is a flowchart illustrating a data recording method of generating metadata according to another exemplary embodiment of the present invention.

In operation S410, a user input signal for requesting generation of a folder is received from a user input device 150. In operation S420, a controller 130 generates a folder a name for the folder based on text data which is generated by using a speech recognition unit 120 according to the user input signal. When a folder with the same already exists, a message informing a user that the folder having the same name exists may be provided.

In operation S430, the controller 130 controls a signal processor 110 to capture an image and to generate an image file. In the exemplary embodiment, metadata may be generated based on the name of the folder generated in operation S420 and is to be included in the image file. In operation S440, the image file is stored in the folder generated in operation S420.

The exemplary data recording method of generating the image file including the metadata illustrated in FIG. 4 may be integrated into the exemplary data recording method of generating the image file including the metadata illustrated in FIG. 3. For example, the method of FIG. 4 may be performed after the method of FIG. 3 is performed. In addition, unlike the operation S410, although the user input signal is not received, when speech is input to the data recording and reproducing apparatus while the user does not review the image file, operations S420 to S440 may be performed to generate a named folder based on the speech.

FIG. 5 is a flowchart illustrating a method of recording and reproducing an image file including metadata according to an exemplary embodiment of the present invention.

When a user input signal for requesting display of an image file is received in operation S510, the controller 130 reads the image file stored in a storage unit 140 to display the image data stored in the image file on a display unit 160 in operation S520. When the image file includes metadata, image data with the metadata of the image file may be displayed. As described above, while the image file is displayed, the metadata included in the image file may also be converted into an audio signal to be output.

When speech is input to a speech recognition unit 120 in operation S530, the speech input to the speech recognition unit 120 is converted into text data, and the controller 130 uses the text data to generate metadata in operation S540. In addition, the operation S530 may be performed only when it is determined that a user input signal for requesting generation of the metadata with respect to the image file being displayed is received from the user input device 150 prior to operation S530.

In operation S550, the controller 130 determines whether metadata is already included or is already stored in the image file.

When it is determined that the image data displayed is an image file which does not include metadata, in operation S550, operation S580 is performed to add the generated metadata to the image file as metadata, so that an image file including the metadata is generated and stored and may be displayed with the image data.

When it is determined that the image data displayed is image data of an image file which includes metadata, in operation S550, the metadata generated from the text data converted from the input speech is compared with the metadata included in the image file. That is, it is determined whether or not the generated metadata is the same as the metadata included in the image file in operation S560.

When it is determined that the generated metadata is not the same as the metadata included in the image file in operation S560, or, when a keyword tag of the generated metadata does not correspond with a keyword tag already included in the image file, the generated metadata is added to the already existing metadata stored in the image file to generate and store an image file that includes both the generated metadata and the existing metadata, in operation S570.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. As an alternative, the computer readable code may be embodied on a carrier waves (such as data transmission through the Internet). The computer readable code may also be distributed over network coupled computer systems so that the computer readable code is stored and executed in a distributed fashion.

Accordingly, at a time when images are recorded, metadata is generated as management information with respect to image contents by using an image contents recording apparatus. Therefore, reliable metadata with respect to the image contents can be generated.

In addition, when images are captured to be recorded, the image files can be stored in a folder having a name which is generated based on the text data generated by using speech recognition before the images are captured. Therefore, the image files can be classified and stored at the beginning of taking images.

In addition, according to an exemplary embodiment of the present invention, an image file includes metadata, so that the apparatus for reading the image file generated according to the exemplary embodiment of the present invention can read the metadata included in the image file and use the metadata as a retrieving keyword.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims and their equivalents, and all differences within the scope will be construed as being included in the present invention.

What is claimed is:

1. A data recording and reproducing apparatus comprising:
  a memory;
  a signal processor which captures images, processes the captured images to generate image data, and generates an image file comprising the image data;
  a speech recognition unit which recognizes first speech, which is related to the image data, and converts the first speech into first text data;
  a controller which generates first metadata using the first text data and adds the generated first metadata to the image file, wherein the controller generates a folder having a name based on the first text data and wherein the controller stores the image file in the folder having the name based on the first text data; and
  a storage unit which stores the generated image file
  a display unit which displays an image from the captured images represented by the image data included in the image file or displays the first metadata along with the image,
  wherein the first metadata comprises a description tag which is generated using the first text data and a keyword tag which is generated by extracting keywords from the first text data, and
  wherein, when newly input second speech is converted into second text data by the speech recognition unit while the images stored in the image file are displayed on the display unit, the controller generates second metadata from the second text data and compares if the second metadata is different with the first metadata in the image file, and if the second metadata is different from the first metadata in the image file, the controller adds the second metadata to the first metadata in the image file.

2. The apparatus of claim 1, wherein, if the first speech is input to the speech recognition unit to be converted into the first text data when no image data is displayed on the display unit, the controller generates a folder having a name based on the first text data.

3. The apparatus of claim 1, further comprising an audio output unit which outputs an audio signal, and
  wherein the controller converts the first metadata in the image file, the image data of which is currently displayed, into an audio signal to output the audio signal to the audio output unit while the image data of the image file is displayed on the display unit.

4. A data recording and reproducing method comprising:
  processing captured images to generate images data, and generating an image file comprising the image data;
  recognizing first speech by speech recognition unit, which is related to the image data, and converting the first speech into first text data by the speech recognition unit;
  by a controller using a processor, generating first metadata using the first text data and adding the generated first metadata to the image file, wherein the controller generates a folder having a name based on the first text data and wherein the controller stores the image file in the folder having the name based on the first text data; and
  storing the generated image file in a storage unit;
  displaying an image from the captured images represented by the image data included in the image file or displaying the first metadata along with the image,
  wherein the first metadata comprises a description tag which is generated using the first text data and a keyword tag which is generated by extracting keywords from the first text data;
  wherein, when newly input second speech is converted into second text data by said speech recognition unit while the images stored in the image file are displayed, generating second metadata from the second text data and comparing if the second metadata is different with the first metadata in the image file by the controller, and if the second metadata is different from the first metadata in the image file, the controller adds the second metadata to the first metadata in the image file.

5. A non-transitory computer-readable medium having embodied thereon a computer program for executing a data recording and reproducing method comprising:
- processing captured images to generate images data, and generating an image file comprising the image data;
- recognizing first speech by a speech recognition unit, which is related to the image data, and converting the first speech into first text data by the speech recognition unit;
- by a controller using a processor, generating first metadata using the first text data and adding the generated first metadata to the image file, wherein the controller generates a folder having a name based on the first text data and wherein the controller stores the image file in the folder having the name based on the first text data; and
- storing the generated image file in a storage unit;
- displaying an image from the captured images represented by the image data included in the image file or displaying the first metadata along with the image,
- wherein the first metadata comprises a description tag which is generated using the first text data and a keyword tag which is generated by extracting keywords from the first text data;
- wherein, when newly input second speech is converted into second text data by said speech recognition unit while the images stored in the image file are displayed, generating second metadata from the second text data and comparing if the second metadata is different with the first metadata in the image file by the controller, and if the second metadata is different from the first metadata in the image file, the controller adds the second metadata to the first metadata in the image file.

6. The data recording and reproducing apparatus of claim 1, wherein the data recording and reproducing apparatus further comprises:
a lens, wherein the signal processor captures the images focused through the lens.

7. The method of claim 4, wherein, if the first speech is input to the speech recognition unit to be converted into the first text data when no image data is displayed, the controller generates a folder having a name based on the first text data.

8. The method of claim 4, further comprising outputting an audio signal from an audio output unit, and
converting by the controller the first metadata in the image file into an audio signal to output the audio signal to the audio output unit while the image data of the image file is displayed, the image data of which is currently displayed.

9. The method of claim 4, wherein the method further comprises:
capturing the images focused through a lens by a signal processor.

10. The non-transitory computer-readable medium of claim 5, wherein, if the first speech is input to the speech recognition unit to be converted into the first text data when no image data is displayed, the controller generates a folder having a name based on the first text data.

11. The non-transitory computer-readable medium of claim 5, further comprising outputting an audio signal from an audio output unit, and converting by the controller the first metadata in the image file into an audio signal to output the audio signal to the audio output unit while the image data of the image file is displayed, the image data of which is currently displayed.

12. The non-transitory computer-readable medium of claim 5, wherein the method further comprises:
capturing the images focused through a lens by a signal processor.

* * * * *